July 21, 1942.  E. R. HODGIN  2,290,806

STILL

Filed July 5, 1941

INVENTOR
Ellis R. Hodgin
BY
ATTORNEY

Patented July 21, 1942

2,290,806

UNITED STATES PATENT OFFICE 2,290,806

STILL

Ellis R. Hodgin, Greensboro, N. C.

Application July 5, 1941, Serial No. 401,148

7 Claims. (Cl. 202—118)

This invention relates to new and useful improvements in stills, and has more particular reference to a still adapted for continuous operation.

The invention particularly proposes an apparatus as mentioned which is capable of carrying out continuously, destructive distillation or other types of distillation.

The chief object of the invention is to so construct the apparatus that there may be continuous distillation without having to stop and empty the still. An arrangement is proposed whereby the gases, or other distillate, which comes off from the material being distilled, may be suitably collected.

More particularly, the invention proposes to characterize the still by a cylinder for the material to be distilled and having an inlet at one end and an outlet at its other end, a worm drive for continuously moving material through said cylinder from the inlet to the outlet and an arrangement whereby this material is treated during its travel through said cylinder.

The invention also contemplates the provision of means along the length of said cylinder for drawing off the distillate gases, vapors, etc. A furnace is also proposed for heating said cylinder during the distilling operation.

The invention also proposes an arrangement by which the cylinder may be of any size or length for controlling the distilling action.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Figure 1:
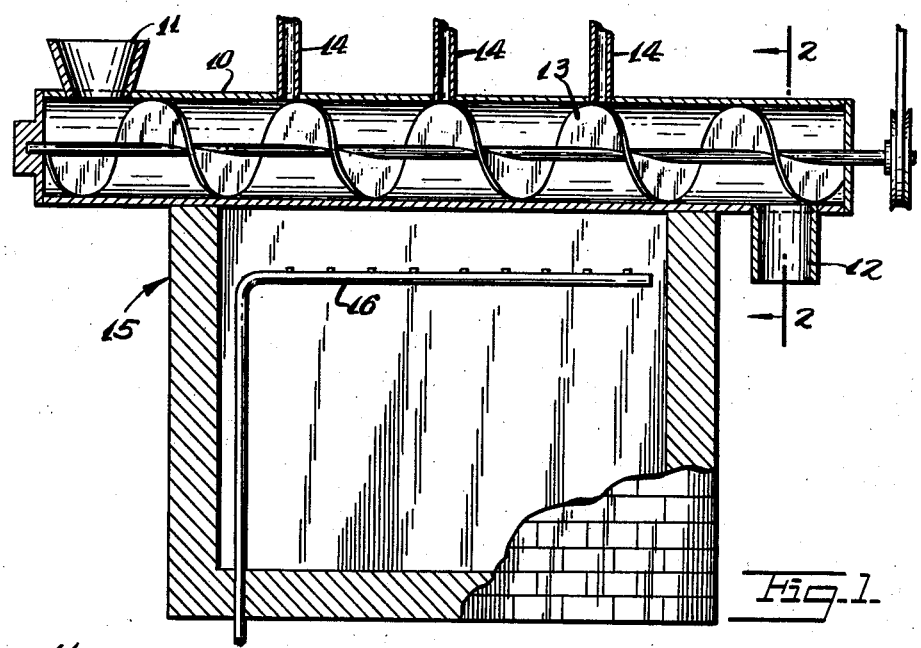
Fig. 1 is a vertical sectional view of a still constructed in accordance with this invention.

The still for continuous operation, in accordance with this invention, includes a cylinder 10 for the material to be distilled. This cylinder has an inlet 11 at one end and an outlet 12 at its other end. A worm drive 13 is arranged within the cylinder 10 for continuously moving said material through the cylinder from said inlet 11 to said outlet 12. Means is provided along the length of the cylinder 10 for drawing off the distillate gases, vapors, etc. This means comprises a plurality of pipes 14 arranged at spaced positions along the top of the cylinder 10. A furnace 15 is located beneath the cylinder 10 for heating the materials conveyed therein. This furnace includes the burner 16.

The operation of the device is as follows:

The material to be continuously distilled is placed into the inlet 11 and the worm drive 13 conveys this material through the cylinder 10 at a selected speed, depending upon the material. To do this the worm drive 13 must be operated at a suitable speed. The heat from the furnace 15 acts upon the material within the cylinder 10 so that gases and vapors are driven off through the pipes 14. These pipes may discharge in suitable vessels or receptacles, not illustrated on the drawing. The remains of the material which is being distilled will discharge from the outlet 12. These remains may comprise charcoal or other remains depending upon the heat applied, the time of application of the heat, and the material being distilled.

Figure 3:
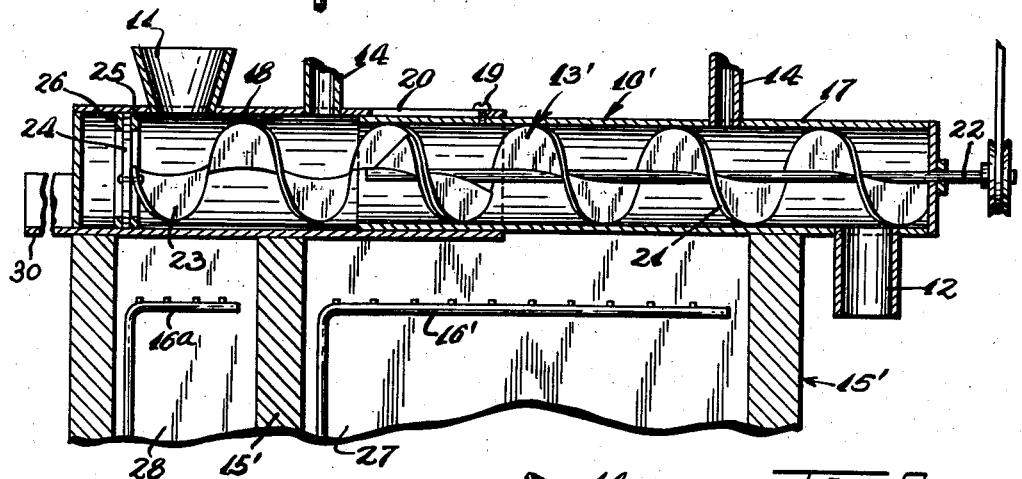
Fig. 3 is a fragmentary vertical sectional view of a still constructed according to a modified form of the invention.
Figure 2:
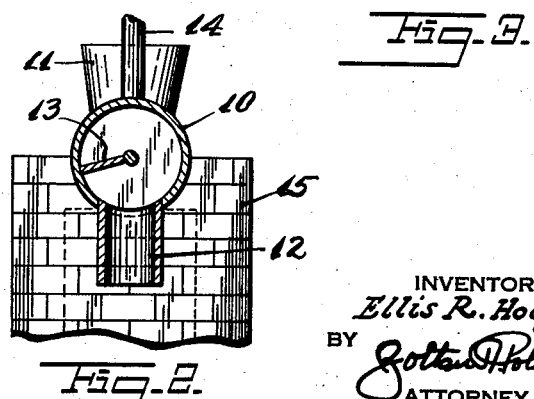
Fig. 2 is a transverse sectional view taken on the line 2—2 of Fig. 1.

In Fig. 3 a modified form of the invention has been disclosed which distinguishes from the prior form in an arrangement whereby the operative length of the still may be varied to accommodate different types of material and substances to be distilled. In accordance with this form of the invention the cylinder 10' is formed from two sections. There is a stationary section 17 which is mounted on the furnace 15, and there is a movable and adjustable section 18. This section 18 telescopically engages one end of the section 17. These sections are adjustably connected. A fastening element 19 is mounted on one of the sections and engages a slot 20 on the other of the sections to prevent complete disengagement of the sections. The cylinder 10' is provided with a worm drive 13' which is also of extendable construction.

The worm drive 13' comprises a section 21 fixedly mounted upon the driver shaft 22. The worm drive 13' also includes a section 23 which is screwed onto the free end of the section 21. This section 23 has its outer end connected with a disc 24 which is rotatively mounted between a pair of rings 25 and 26 which are transversely mounted across the outer end of the cylinder section 18. The arrangement is such that when the section 18 is moved axially inwards or outwards of the section 17, the worm section 23 will screw on to or off the worm section 21. When the worm section is being driven by the shaft 21 the worm section 23 will also be rotated.

The furnace 15' is also constructed of sections. It is provided with a main section 27 located beneath the cylinder sections 17 and an additional section 28 beneath the cylinder section 18 when the latter is extended. Each furnace section is provided with its own burner. The section 27 has the burner 16' while the section 28 has the burner 16ᵃ. A baffle 30 projects from the outer end of the cylinder section 18 and is adapted to extend over and to cover the furnace section 28 when the cylinder section 18 is in its retracted position.

The cylinder 10' is provided with pipes 14 through which the distillates may discharge.

The operation of this form of the invention is substantially identical to the prior form in so far as the material to be distilled, is placed into the inlet 11 and is carried by the worm 13' through the cylinder 10' and discharged through the outlet 12. However, when it is desired to distill certain material it is advantageous to increase the length of the cylinder 10'. This may be done by loosening the screw 19 and extending the cylinder section 18. Automatically the worm section 23 will be similarly extended. The burner section 16ᵃ may then be placed into operation. The parts are now in the position as illustrated in Fig. 3.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention what I claim as new, and desire to secure by United States Letters Patent is:

1. A still for continuous operation, comprising a cylinder for the material to be distilled and having an inlet at one end and an outlet at its other end, a worm drive for continuously moving said material through said cylinder from said inlet to said outlet, means along the length of said cylinder for drawing the distillate gases, vapors, etc., a furnace for heating said cylinder, said cylinder comprising a pair of telescopic sections and means for holding said sections in various extended positions, said worm comprising a pair of sections threadedly connected with each other, and one of said worm sections being rotatively connected with an extendable section of said cylinder.

2. A still for continuous operation, comprising a cylinder for the material to be distilled and having an inlet at one end and an outlet at its other end, a worm drive for continuously moving said material through said cylinder from said inlet to said outlet, means along the length of said cylinder for drawing the distillate gases, vapors, etc., a furnace for heating said cylinder, said cylinder comprising a pair of telescopic sections and means for holding said sections in various extended positions, said worm comprising a pair of sections threadedly connected with each other, and one of said worm sections being rotatively connected with an extendable section of said cylinder, the other section of said worm being rotative but non-slidably associated with the other section of said cylinder.

3. A still for continuous operation, comprising a cylinder for the material to be distilled and having an inlet at one end and an outlet at its other end, a worm drive for continuously moving said material through said cylinder from said inlet to said outlet, means along the length of said cylinder for drawing the distillate gases, vapors, etc., a furnace for heating said cylinder, said cylinder comprising a pair of telescopic sections and means for holding said sections in various extended positions, said worm comprising a pair of sections threadedly connected with each other, and one of said worm sections being rotatively connected with an extendable section of said cylinder, and said furnace being provided with separate sections individually operated depending on the distance that said extendable sections are extended.

4. A still for continuous operation, comprising a cylinder for the material to be distilled and having an inlet at one end and an outlet at its other end, a worm drive for continuously moving said material through said cylinder from said inlet to said outlet, means along the length of said cylinder for drawing the distillate gases, vapors, etc., a furnace for heating said cylinder, said cylinder comprising a pair of telescopic sections and means for holding said sections in various extended positions, said worm comprising a pair of sections threadedly connected with each other, and one of said worm sections being rotatively connected with an extendable section of said cylinder, and said furnace being provided with separate sections individually operated depending on the distance that said extendable sections are extended, said extendable sections of said cylinder being provided with a baffle to extend over those sections of the furnace which are not being used.

5. In a still for continuous operation, a cylinder for the material to be distilled and formed of separate sections telescopically engaging each other to be extendable for controlling the operative length of said cylinder, an inlet formed at the outer end of one of said cylinder sections and an outlet formed at the outer end of the other of said cylinder sections, a worm drive for continuously moving said material through said cylinder from said inlet to said outlet, said worm drive being formed of a pair of sections threadedly connected with each other and one of said worm drive sections being rotatively connected with one of said cylinder sections and the other of said worm drive sections being rotatively but non-slidably connected with the other of said cylinder sections causing said worm drive sections to be extended when said cylinder sections are extended, and means for securely holding said cylinder sections in various extended positions.

6. In a still for continuous operation, a cylinder for the material to be distilled and formed of separate sections telescopically engaging each other to be extendable for controlling the operative length of said cylinder, an inlet formed at the outer end of one of said cylinder sections and an outlet formed at the outer end of the other of said cylinder sections, a worm drive for continuously moving said material through said cylinder from said inlet to said outlet, said worm drive being formed of a pair of sections threadedly connected with each other and one of said worm drive sections being rotatively connected with one of said cylinder sections and the other of said worm drive sections being rotatively but non-slidably connected with the other of said cylinder sections causing said worm drive sections to be extended when said cylinder sections are extended, and means for securely holding said cylinder sections in various extended positions, comprising a screw passing freely through an elongated slot formed in the inner end of the outer of said cylinder sections and threadedly engaging a complementary opening in the inner end of the inner of said cylinder sections.

7. In a still for continuous operation, a cylinder for the material to be distilled and formed of separate sections telescopically engaging each other to be extendable for controlling the operative length of said cylinder, an inlet formed at the outer end of one of said cylinder sections and an outlet formed at the outer end of the other of said cylinder sections, a worm drive for continuously moving said material through said cylinder from said inlet to said outlet, said worm drive being formed of a pair of sections threadedly connected with each other and one of said worm drive sections being rotatively connected with one of said cylinder sections and the other of said worm drive sections being rotatively but non-slidably connected with the other of said cylinder sections causing said worm drive sections to be extended when said cylinder sections are extended, and means for securely holding said cylinder sections in various extended positions, comprising a screw passing freely through an elongated slot formed in the inner end of the outer of said cylinder sections and threadedly engaging a complementary opening in the inner end of the inner of said cylinder sections, said inner cylinder section having its inner end projected beyond its point of connection with said screw to engage over and cover said slot in all the extended positions of said cylinder sections to prevent the escape of distillate gases, vapors, etc. through said slot.

ELLIS R. HODGIN.